March 27, 1962  H. W. BOTELER  3,026,909
REINFORCED DIAPHRAGM

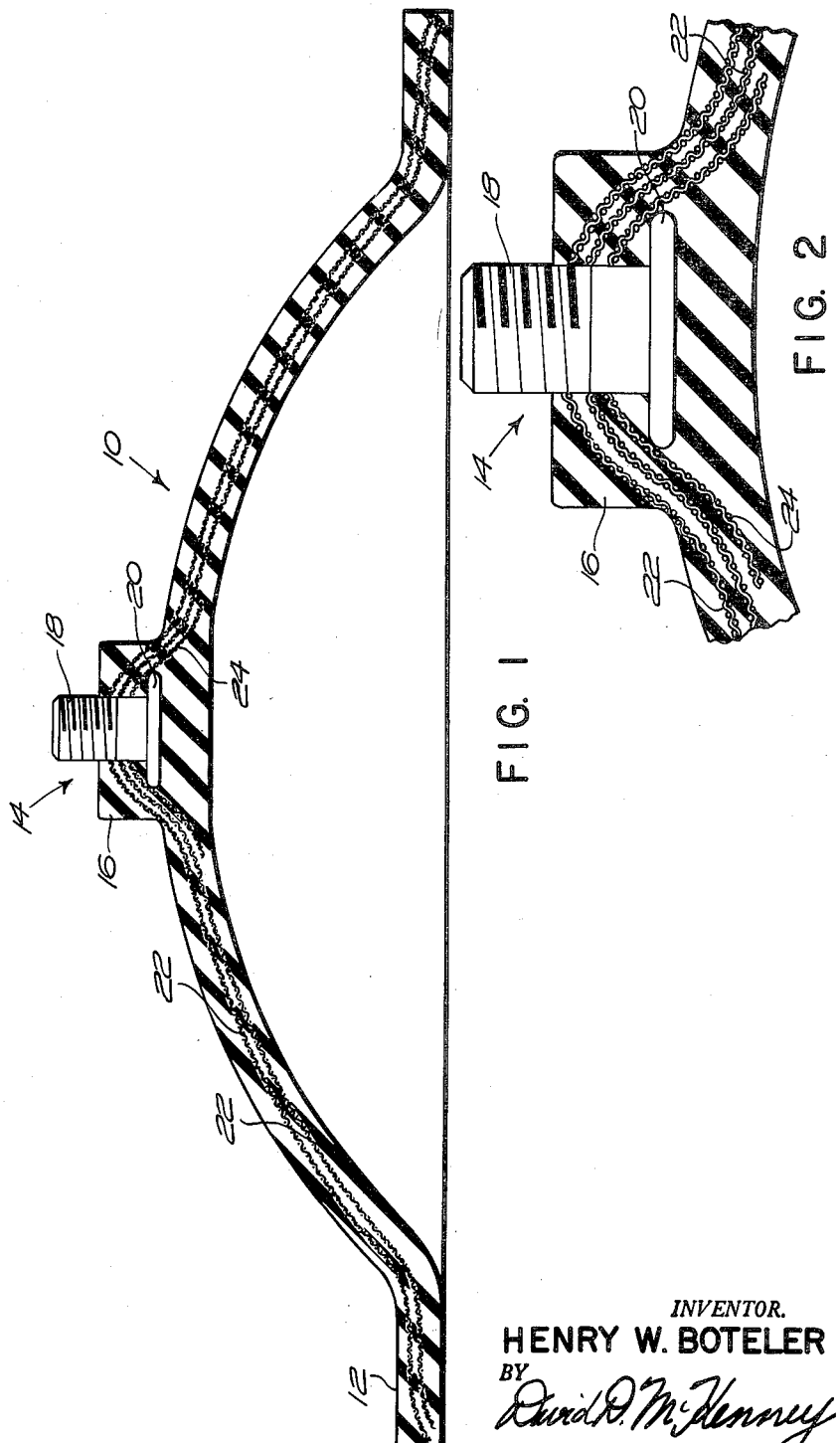

Filed March 27, 1959  2 Sheets-Sheet 2

INVENTOR.
HENRY W. BOTELER
BY
ATTORNEY

United States Patent Office 3,026,909
Patented Mar. 27, 1962

3,026,909
REINFORCED DIAPHRAGM
Henry W. Boteler, East Greenwich, R.I., assignor to Grinnell Corporation, Providence, R.I., a corporation of Delaware
Filed Mar. 27, 1959, Ser. No. 802,279
3 Claims. (Cl. 137—793)

This invention relates to a diaphragm for a diaphragm valve and more particularly to a manner of reinforcing the diaphragm with fabric. The portions of such a diaphragm which are subject to the greatest stress concentration are the peripheral zone adjacent the valve clamping flanges and the central portion in which is embedded the enlarged head of a stud. This invention is particularly concerned with reinforcement against the stresses in the latter portion.

Diaphragms are commonly made of rubber-like substances known as elastomers, such as neoprene, Hycar, polyvinyl chloride polymers and the like. All of these materials require fabric reinforcement to preclude rupture of the diaphragm due to its deformation while in use.

By far the greatest need for reinforcement is traced to the stud which must be prevented from pulling out of the diaphragm upon opening of the valve. In certain sizes of valves the stud stresses to which the diaphragms are subject are so severe that as many as five reinforcing layers are required to produce a satisfactory diaphragm. These layers yield a diaphragm sufficiently strong to withstand stresses at the stud yet stronger than necessary to withstand other stresses. Each reinforcement layer represents a manufacturing cost in labor and in the value of the fabric itself. Practice of the invention herein disclosed permits a substantial reduction in the number of reinforcing layers of fabric while maintaining the desired resistance to stud pull-out. Reduction in the number of fabric layers further enhances the flexibility of the diaphragm, resulting in smaller actuating effort. Further, fewer layers of fabric result in a greater elastomer thickness from the working face of the diaphragm to the layer nearest to it.

With the most widely used method of forming diaphragms, the fabric reinforcing layers are coextensive with at least the flexed portion of the diaphragm and a tensile stress appears in the strands of each such layer. The appearance of this stress is inherent in the manner of the diaphragm's formation. The present invention introduces a reinforcing layer of fabric lesser in area than the flexed diaphragm portion and located between the head of the usual stud and the other reinforcing fabric layers. By virtue of its size and location this smaller layer enjoys a lesser tensile stress in its strands as a result of diaphragm formation. As a consequence of these factors, fewer fabric layers of the same size as the diaphragm are required to maintain a satisfactorily high pull-out strength for the stud.

In the drawings,

FIG. 1 is a cross-sectional view of a diaphragm of elastomer material provided with fabric reinforcing layers according to this invention.

FIG. 2 is a detailed cross-sectional view on a larger scale of the central portion of FIG. 1.

Figure 3:
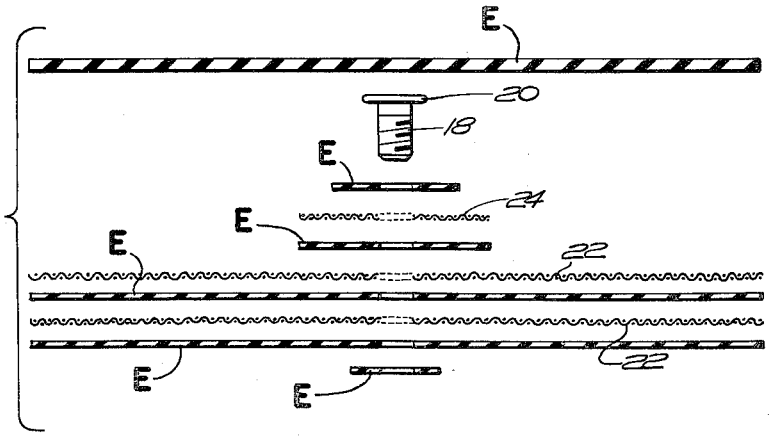
FIG. 3 is an exploded view of the component layers of fabric and elastomer, with the stud, prior to molding.

Referring now to FIG. 1 of the drawings the numeral 10 denotes a diaphragm according to this invention formed of an elastomer material such as neoprene and generally curved in cross-section and having a flat periphery 12 adapted to be clamped between the body and bonnet of a diaphragm valve. The diaphragm may be oval, round or any other shape in plan view and need not have a flat periphery. The diaphragm includes a central portion 14 having a nodule 16 in which is embedded a threaded stud 18 with an enlarged head 20. One or more layers of fabric reinforcing material 22, such as nylon, is located within the diaphragm and coextensive with at least its flexed portion. With a plurality of layers, each layer is spaced from the other. Each layer is provided with a preformed hole therein through which extends the shank of the stud 18. Between the lowermost layer 22 and the enlarged head 20 another reinforcing layer 24 of fabric extends. This layer is lesser in area than layer 22 and is also provided with a preformed hole through which extends the shank of stud 18.

Figure 4:
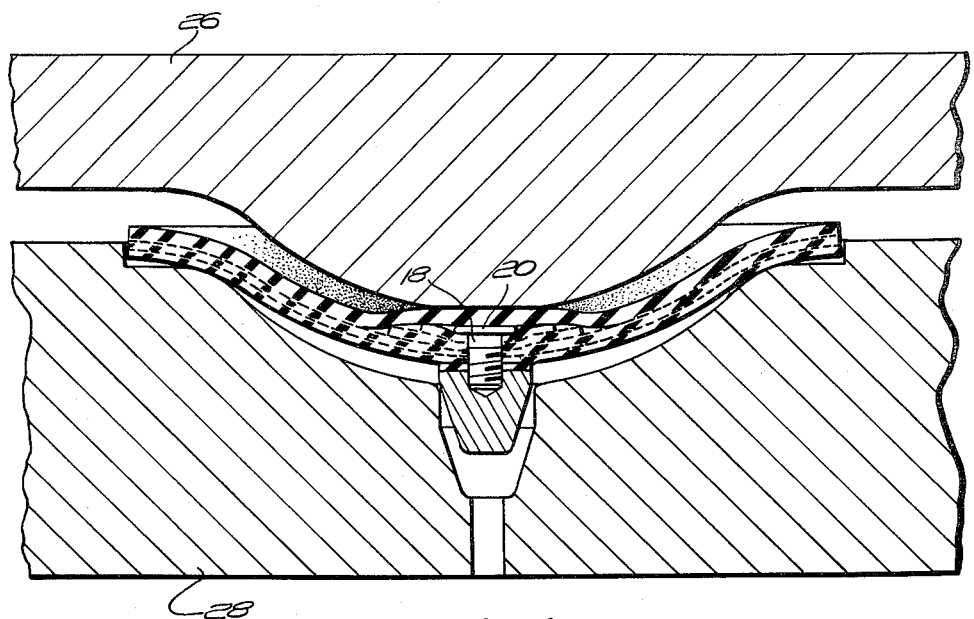
FIG. 4 is a view of the elements of FIG. 3 assembled by a threaded cup screwed to the stud and placed in a mold just prior to final closing of the mold and application of heat.

A preferred manner of assembly of the various layers of elastomer and fabric the diaphragm is illustrated in FIG. 3 of the drawings wherein the letter E denotes various layers of elastomer. The elastomer and fabric layers are assembled in the relation shown and placed between two halves 26 and 28 of a mold (FIG. 4) which deform and clamp them, by any suitable force applying mechanism such as a hydraulic press. The mold is then raised to and maintained at an elevated temperature by any suitable heating method. The curing time will vary with the type and volume of the elastomer. With, for example, a two and one-half inch neoprene diaphragm the assembly was baked for one-half hour at 300° F. The pressure on the mold was approximately 1400 p.s.i. After baking, the elastomer layers are found to have fused together, a cross-section of the diaphragm presenting the appearance of a homogeneous mass interspersed with fabric reinforcement.

The compression molding process places a tensile stress in the fabric layers 22. It is thought that this is due to the outward radial flow of elastomer in the mold and to the deformation of the fabric from an initial flat sheet formed to the curved shape of the mold cavity. The tensile stresses in the large layers such as 22 are so great that the fabric is often unable to sustain the additional stresses imposed on it at the stud 18 by its enlarged head 20 when the stud is pulled upward to open the valve. Failure of the fabric at the stud 18 results in the stud being pulled out of the diaphragm.

The outward radial flow results from slight overloading of the mold. To preclude the formation of cavities or voids in the finished diaphragm, the volume of the various elastomer layers shown in FIG. 2 is slightly greater than the volume of the mold cavity. The excess results in flashing. Some such flashing is always present no matter how great the force exerted on the mold because the elastomer is incompressible.

The bond between the elastomer and the strands of the fabric reinforcement with the outward radial flow of elastomer produces a tensile stress on the fabric strands. Assuming that the bond between the elastomer and the strands is uniform at all points, the total tensile stress on any strand will be the product of its length and the unit bond stress.

The deformation of the fabric results from the mold's forcing the fabric into a domed shape from an initial flat shape. Before molding, the fabric is usually coated with uncured elastomer. As the various layers shown in FIG. 3 are initially deformed by the mold, as in FIG. 4, the fabric layers 22 tend to slide relative to the elastomer layers between which they are sandwiched. Such sliding is not, however, entirely free because the coated fabric sticks or binds somewhat to the elastomer. The periphery of any layer 22 is therefore not entirely free to move inwardly while its central portion is being domed by the mold. It must therefore stretch. This action is thought to be even more pronounced immediately adjacent the stud, because these portions at the fabric have to undergo a deformation up into the nodule 16 in addition to the deformation required to dome the entire fabric layer 22.

Fabric layer 24, being of lesser extent than the others, enjoys a lesser tensile stress. Because it is smaller, it suffers less stress in deformation and less stress from the elastomer's outward flow. Placed between the stud head and a layer 22, it withstands upward forces on the stud immediately adjacent the stud head.

Observation has shown that the stud pull-out strength of diaphragms made in accordance with this invention is nearly twice as great as with diaphragms made by conventional methods. This permits the manufacture of diaphragms with a fewer number of large layers 22 but with the same pull-out strength.

I claim:

1. A molded diaphragm valve diaphragm having two substantially parallel faces and of flexible elastomer having a central portion of convexo-concavo shape with an integral regular nodule at the center of the convex face and adapted to be flexed and a peripheral flat portion adapted to be clamped, said diaphragm including a first layer of reinforcing fabric between the faces of the diaphragm, said first fabric layer extending from the outer boundary of the peripheral portion on one side of the diaphragm across the central portion to the outer boundary of the peripheral portion on the opposite side of the diaphragm, said first fabric layer being stressed in tension due to the molding of the diaphragm, a stud having an enlarged head embedded in the central part of the diaphragm and having a shank passing through an aperture in the said first fabric layer and projecting from the nodule on the convex face of said diaphragm, a second layer of fabric between the stud head and the first fabric layer, said second fabric layer having an aperture therein through which said stud shank passes, a layer of elastomer between the first and second fabric layers, said second fabric layer being larger than said nodule, and extending into said central portion and being substantially smaller in area and stressed in tension less than said first fabric layer.

2. The diaphragm of claim 1 wherein there is a layer of elastomer between said second layer and said enlarged stud head.

3. The diaphragm of claim 1 wherein all portions of the said second fabric layer are spaced from the concave face.

References Cited in the file of this patent

UNITED STATES PATENTS

| 212,488 | Mounteney | Feb. 18, 1879 |
| 2,324,800 | Rogers et al. | July 20, 1943 |

FOREIGN PATENTS

| 516,872 | Canada | Sept. 27, 1955 |
| 685,935 | Great Britain | Jan. 14, 1953 |